(12) United States Patent
You et al.

(10) Patent No.: US 10,579,484 B2
(45) Date of Patent: Mar. 3, 2020

(54) APPARATUS AND METHOD FOR ENHANCING RELIABILITY OF WATCHDOG CIRCUIT FOR CONTROLLING CENTRAL PROCESSING DEVICE FOR VEHICLE

(71) Applicants: Hyundai Motor Company, Seoul (KR); Kia Motors Corporation, Seoul (KR)

(72) Inventors: Chang Seok You, Gyeonggi-do (KR); Min Su Kang, Gyeonggi-do (KR); Sung Do Kim, Seoul (KR); Dong Hun Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 303 days.

(21) Appl. No.: 15/822,791

(22) Filed: Nov. 27, 2017

(65) Prior Publication Data

US 2019/0079835 A1 Mar. 14, 2019

(30) Foreign Application Priority Data

Sep. 13, 2017 (KR) ........................ 10-2017-0117161

(51) Int. Cl.
*G06F 11/00* (2006.01)
*G06F 11/14* (2006.01)
*G06F 11/07* (2006.01)

(52) U.S. Cl.
CPC ...... *G06F 11/1497* (2013.01); *G06F 11/0739* (2013.01); *G06F 11/0757* (2013.01)

(58) Field of Classification Search
None
See application file for complete search history.

(56) References Cited

U.S. PATENT DOCUMENTS

| | | | | |
|---|---|---|---|---|
| 5,281,900 | A * | 1/1994 | Park | B60L 15/007 318/139 |
| 9,632,855 | B2 * | 4/2017 | Jung | G06F 11/0757 |
| 2009/0204856 | A1 * | 8/2009 | Sinclair | G06F 11/0778 714/48 |
| 2010/0106356 | A1 * | 4/2010 | Trepagnier | G01S 17/023 701/25 |
| 2013/0227333 | A1 * | 8/2013 | Furukoshi | G06F 11/0757 714/2 |

(Continued)

FOREIGN PATENT DOCUMENTS

KR 10-1526874 B 6/2015

*Primary Examiner* — Jonathan M Dager
(74) *Attorney, Agent, or Firm* — Mintz Levin Cohn Ferris Glovsky and Popeo, P.C.; Peter F. Corless

(57) ABSTRACT

An operating method of a vehicle watchdog circuit is provided. The method includes monitoring whether communication with a vehicle controller through a preset protocol is enabled and when a communication fault does not occur by monitoring whether communication is enabled, transmitting an error detection query to the vehicle controller every preset period. A response to the error detection query is received, and an operation of the vehicle controller is monitored, and upon determining that the operation of the vehicle controller is normal, a plurality of preset reset signals are sequentially transmitted to the vehicle controller.

20 Claims, 9 Drawing Sheets

(56) References Cited

U.S. PATENT DOCUMENTS

| | | | | |
|---|---|---|---|---|
| 2014/0082434 A1* | 3/2014 | Knight | ............... | G05B 19/0428 |
| | | | | 714/55 |
| 2014/0164826 A1* | 6/2014 | Aoki | ................... | G06F 11/0739 |
| | | | | 714/10 |
| 2015/0049774 A1* | 2/2015 | Kim | .................... | H04L 43/0858 |
| | | | | 370/503 |
| 2015/0073604 A1* | 3/2015 | Ro | ........................... | F24F 11/30 |
| | | | | 700/276 |
| 2015/0095724 A1* | 4/2015 | Park | ................... | G06F 11/0757 |
| | | | | 714/55 |
| 2015/0134199 A1* | 5/2015 | Fraser-Chanpong | ........................ | |
| | | | | B60W 10/00 |
| | | | | 701/36 |
| 2018/0357118 A1* | 12/2018 | Jang | ................... | G06F 11/0724 |
| 2019/0077451 A1* | 3/2019 | Thim | .................... | B62D 5/046 |

* cited by examiner

APPARATUS AND METHOD FOR ENHANCING RELIABILITY OF WATCHDOG CIRCUIT FOR CONTROLLING CENTRAL PROCESSING DEVICE FOR VEHICLE

CROSS REFERENCE TO RELATED APPLICATION

This application claims the benefit of Korean Patent Application No. 10-2017-0117161, filed on Sep. 13, 2017, which is hereby incorporated by reference as if fully set forth herein.

BACKGROUND

Field of the Disclosure

The present disclosure relates to an apparatus and method for enhancing reliability of a watchdog circuit for controlling a central processing device for a vehicle, and more particularly, to an external watchdog circuit and a peripheral circuit, which are separated from the vehicle central processing device.

Discussion of the Related Art

Typically, a watchdog timer (WDT), a computer operating properly (e.g., COP timer, or a watchdog circuit) is an electronic timer used to detect and restore a malfunction of a computer. A normally operating computer (e.g., without malfunction) regularly restarts a watchdog timer when time elapses or to prevent "timeout". When a central processing device fails to restart a watchdog circuit due to defective hardware or a program error, a timer is configured to generate a timeout signal over a period of time. The timeout signal is used in various corrective measurements. The corrective measurement generally includes maintenance of a computer system in a stable state and restoration to a normal system operation.

A watchdog timer is used in computer control equipment when interaction with the equipment is difficult or it is difficult to appropriately handle an error. When software freezes or stalls many embedded systems are inevitably dependent upon a manual reboot and a watchdog timer is necessary in an environment that requires self-supporting or independent embedded systems. For example, a remote embedded system such as a space probe is unable to be physically accessed. When a space probe is unable to automatically restore errors, the space probe may be permanently damaged or may continue to operate in a damaged state. Generally, the watchdog timer is used in such a situation. When an unreliable code is operated in a condition that prevents an externally transmitted file or program from adversely affecting an internal system by executing an externally transmitted file in a protected area without immediately executing the externally transmitted file, a watchdog timer is used to limit CPU time to be used in a code. In particular, some types of denial of service attacks may be prevented using the watchdog timer.

A vehicle operation environment requires a self-supporting or independent embedded system. A watchdog circuit for preventing malfunction of a vehicle central control device (i.e., a vehicle controller) is separated from the vehicle central control device and is installed in the vehicle.

The above information disclosed in this section is merely for enhancement of understanding of the background of the disclosure and therefore it may contain information that does not form the prior art that is already known in this country to a person of ordinary skill in the art.

SUMMARY DISCLOSURE

The present disclosure provides an apparatus and method for detecting the possibility of defects of a watchdog circuit and a peripheral circuit arranged external to a vehicle central processing device and for proposing a strategy for controlling external watchdog when defects are detected to enhance overall system reliability.

The present disclosure also provides for diagnosing whether a fault occurs in a functional unit of a watchdog circuit device and peripheral circuits, arranged external to a vehicle central processing device, and for establishing a strategy corresponding to each situation when a fault to prevent risk is due to an abnormal operation. for the present disclosure further provides monitoring a situation, a condition, and an environment in which a watchdog circuit and a peripheral circuit are abnormal, for determining whether a strategy established assuming that a watchdog circuit and a peripheral circuit thereof external to a vehicle central processing device are normal is executed, and for enhancing reliability of the execution result.

The present disclosure may be applied to a vehicle electronic device or a vehicle computing device (e.g., a power control system, a clock system, a data network, a BUS controller, etc.) configured to detect and restore a malfunction through a watchdog circuit and may regularly restart the watchdog circuit when a time period elapses or to prevent "timeout" during a normal operation, thereby enhancing the reliability of an electronic device, a computing device, and an embedded system installed in a vehicle.

In some exemplary embodiments, an operating method of a vehicle watchdog circuit may include monitoring whether communication with a vehicle controller through a preset protocol is enabled, when a communication fault does not occur transmitting an error detection query to the vehicle controller every preset period, receiving a response to the error detection query, and monitoring an operation of the vehicle controller. Upon determining that the operation of the vehicle controller is normal, sequentially transmitting a plurality of preset reset signals to the vehicle controller and monitoring whether the plurality of preset reset signals are transmitted.

In other exemplary embodiments, the monitoring of whether communication is enabled may include transmitting a chip identification number in a vehicle watchdog circuit to the vehicle controller, receiving information regarding whether the chip identification number is matched, from the vehicle controller, and determining whether communication is enabled based on whether the chip identification number is matched. The error detection query may be transmitted every preset period a plurality of times. A transmission number of times of the error detection query may be less by at least one than a reference number of times for generating a reset signal for resetting or interrupting the vehicle controller.

In some exemplary embodiments, the monitoring of the operation of the vehicle controller may include setting a preset positive integer as a register value, transmitting the error detection query, and receiving the response. When the response is normal, subtracting 1 from the register value, repeatedly performing the transmitting of the error detection query, the receiving of the response, and the subtracting as many times as the positive integer, and monitoring whether the register value is 0 to determine whether the operation of the vehicle controller is normal.

The monitoring of the operation of the vehicle controller may include transmitting the preset reset signal to the vehicle controller every preset period, and monitoring a register value of the vehicle controller, and when a transmission number of times of the preset reset signal is equal to the register value, determining that the reset signal is normally transmitted. The vehicle controller may be configured to generate a corresponding one of forcible interrupt and reset in response to the register value.

The method may further include outputting corresponding different fault signals and error codes in response to when a communication fault occurs, when the operation of the vehicle controller is abnormal, and when the vehicle controller is not reset. The method may further include recognizing the vehicle controller upon receiving power in one of a vehicle turn-on state (IGN/Start), an electronic device activation state (ON), and an accessory activation state (ACC).

In another aspect of an exemplary embodiment of the present disclosure, a computer readable recording medium may be executed by a processor and may record an application program for executing the aforementioned operating method of the vehicle watchdog circuit. In another aspect of an exemplary embodiment of the present disclosure, a vehicle watchdog circuit device may include a detector configured to monitor whether communication with a vehicle controller through a preset protocol is enabled, an examiner configured, when a communication fault does not occur by monitoring whether communication is enabled, to transmit an error detection query to the vehicle controller every preset period, to receive a response to the error detection query, and to monitor an operation of the vehicle controller, and a reset signal generator configured, upon determining that the operation of the vehicle controller is normal, to sequentially transmit a plurality of preset reset signals to the vehicle controller and to monitor whether the plurality of preset reset signals are transmitted.

The detector may be configured to transmit a chip identification number in a vehicle watchdog circuit to the vehicle controller, receive information regarding whether the chip identification number is matched from the vehicle controller, and determine whether communication is enabled based on whether the chip identification number is matched. The error detection query may be transmitted every preset period a plurality of times, and a transmission number of times of the error detection query may be reduced by at least one than a reference number of times for generating a reset signal for resetting or interrupting the vehicle controller.

The examiner may be configured to determine a preset positive integer as a register value, transmit the error detection query and receive the response. Additionally, when the response is normal, a subtraction of 1 from the register value, may repeatedly perform the transmitting of the error detection query, the receiving of the response, and the subtracting as many times as the positive integer, and may monitor whether the register value is 0 to determine whether the operation of the vehicle controller is normal.

The reset signal generator may be configured to transmit the preset reset signal to the vehicle controller every preset period, monitor a register value of the vehicle controller, and when a transmission number of times of the preset reset signal is equal to the register value, determine that the reset signal is normally transmitted. The vehicle watchdog circuit device may further include an output unit configured to output a corresponding different fault signals and error codes in response to when a communication fault occurs, when the operation of the vehicle controller is abnormal, and when the vehicle controller is not reset. The detector may be configured to recognize the vehicle controller upon receiving power when a vehicle turn-on state (IGN/Start), an electronic device activation state (ON), and an accessory activation state (ACC)

In another aspect of an exemplary embodiment of the present disclosure, a vehicle control device may include a transceiver configured to transmit and receive data to and from a plurality of control modules and a plurality of switching circuits through a vehicle network, a storage configured to store unique information and control program for the plurality of control modules and the plurality of switching circuits, and a calculator configured to apply the data from the transceiver and the storage to the unique information and the control program to perform calculation. Additionally, the device may include an interrupt unit configured to detect a vehicle watchdog circuit through the transceiver, to transmit the error detection query transmitted from the vehicle watchdog circuit to the calculator, and to generate a corresponding one of reset and interrupt in response to a plurality of preset reset signals transmitted from the vehicle watchdog circuit, and an input and output unit configured to interrupt reception of the reset signal transmitted to the interrupt unit in response to a diagnosis result transmitted from the vehicle watchdog circuit.

A corresponding one of the reset and the interrupt may be generated when a register value of the interrupt unit is M (e.g., natural number), and when power is supplied and the interrupt unit detects the vehicle watchdog circuit, the register value may be initialized to a value less than M by at least one. The calculator may be configured to receive a control program that corresponds to the error detection query from the storage and may be configured to perform a calculation and transmit a calculation result to the vehicle watchdog circuit through the transceiver. The diagnosis result may include a result of at least one of whether a communication function in the vehicle watchdog circuit malfunctions, whether a watchdog control function malfunctions, or whether the reset signal generation function malfunctions.

BRIEF DESCRIPTION OF THE DRAWINGS

The accompanying drawings, which are included to provide a further understanding of the disclosure and are incorporated in and constitute a part of this application, illustrate exemplary embodiment(s) of the disclosure and together with the description serve to explain the principle of the disclosure. In the drawings.

DETAILED DESCRIPTION

Figure 1:
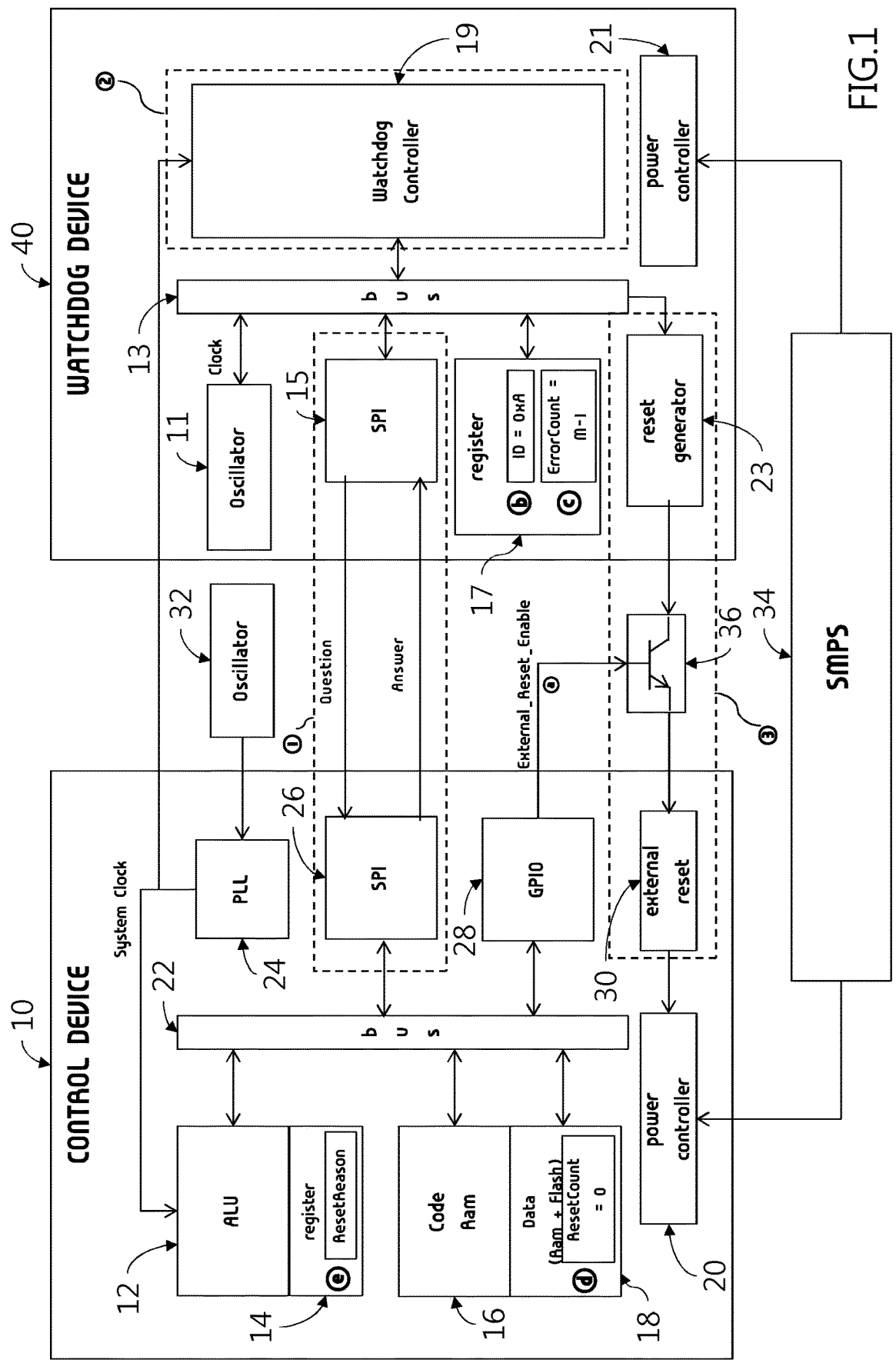
FIG. 1 is an exemplary diagram for explanation of a vehicle control device and a vehicle watchdog device according to an exemplary embodiment of the present disclosure.

While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other exemplary embodiments, which may be included within the spirit and scope of the disclosure as defined by the appended claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present disclosure clear, unrelated parts are not shown and, the thicknesses of layers and regions are exaggerated for clarity. Further, when it is stated that a layer is "on" another layer or substrate, the layer may be directly on another layer or substrate or a third layer may be disposed there between.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Reference will now be made in detail to the exemplary embodiments of the present disclosure, examples of which are illustrated in the accompanying drawings. In addition, the suffixes "module" and "unit" of elements herein are used for convenience of description and thus can be used interchangeably and do not have any distinguishable meanings or functions.

In description of exemplary embodiments, it will be understood that, when an element is referred to as being "on" or "under" another element, the element can be directly on another element or intervening elements may be present. In addition, when an element is referred to as being "on" or "under" another element, this may include a downward direction as well as an upward direction.

FIG. 1 is an exemplary diagram for illustrating of a vehicle control device and a vehicle watchdog device. As an electronic control device or system may be used in a vehicle, safety of operating and driving of a vehicle control device (e.g., an ECU) for controlling or supporting various electronic control devices or systems has become important. The operating safety of a central processing device may be required as one of core components of a vehicle control device. However, a central processing device implemented with a semiconductor chip may have defects in design and manufacturing and an error (e.g., a software error) may occur during an operation corresponding to a request of a vehicle and a user or a driver. When a vehicle control device 10 in a driving vehicle freezes or stalls due to such an error or defects, driving safety of a driver or a user may be compromised or the driver or the user may not be capable of receiving help of an electronic control device installed in a vehicle. Accordingly, the vehicle control device 10 may include or may be operatively associated with a vehicle watchdog device 40 configured to periodically monitor the vehicle control device 10.

The vehicle watchdog device 40 may be implemented with a module with the vehicle control device 10 but may be implemented as an external device that is connected to the vehicle control device 10 via a vehicle network or a serial peripheral interface (SPI). When the vehicle watchdog device 40 and the vehicle control device 10 are implemented as one module, integration density may be advantageously increased to achieve reduce the size of the module. When an error is detected, it may be difficult to determine whether the detected error occurs in the vehicle control device 10 or the vehicle watchdog device 40. When the vehicle watchdog device 40 and the vehicle control device 10 are installed separately, they may be configured to receive independent power and system clocks and a more accurate monitoring result may be achieved in a procedure of monitoring the vehicle control device 10.

The vehicle watchdog device 40 and the vehicle control device 10 may be configured to periodically transmit and receive data via serial communication to monitor whether the vehicle control device 10 is operating under normal condition (e.g., without malfunctions) s. Additionally, when a problem in data transmission and reception is detected and a current situation is determined to be a watchdog situation, the vehicle watchdog device 40 may be configured to transmit a signal for generating reset or interrupt to the vehicle control device 10 to initialize the vehicle control device 10. Thereby, the vehicle control device 10 may be prevented from intermittent interruption (e.g., freezing) or malfunctioning and a user may recognize this situation.

Additionally, monitoring the vehicle control device 10 through the vehicle watchdog device 40 may cause an error or malfunction of the vehicle control device 10 to be normally detected and overcome provided that there is no problem in an operation of the vehicle watchdog device 40 and a peripheral circuit of the vehicle watchdog device 40. For example, when the vehicle control device 10 is operating normally and the vehicle watchdog device 40 encounters an error, when a user or a driver is notified that there is a problem in the vehicle control device 10 the reliability may be degraded.

The vehicle watchdog device 40 and a peripheral circuit thereof may be implemented in the form of a board or a module using a semiconductor chip and errors and defects may occur in the vehicle control device 10. When the vehicle watchdog device 40 and the vehicle control device 10 that have been described with reference to FIG. 1 predict and detect the possibility of defects of the vehicle watchdog device 40 and a peripheral circuit thereof that are connected to the vehicle control device 10 via a vehicle network, a strategy for separate watchdog control may be proposed to enhance overall reliability of an electronic control device or system of a vehicle.

Referring to FIG. 1, the vehicle control device 10 and the vehicle watchdog device 40 may be connected using a vehicle network (e.g., serial communication) (reference numeral 1). Data may be transmitted and received between the vehicle control device 10 and the vehicle watchdog device 40 using a serial peripheral interface (SPI) method 1. The vehicle watchdog device 40 may be configured to periodically transmit a query (e.g., question) via serial communication (e.g., SPI) and whether the vehicle control device 10 is normally operated may be determined using a communication method of receiving an answer as a response to the query.

The vehicle control device 10 may include an arithmetic logic unit (ALU) 12 as a combination logic circuit configured to perform an actual arithmetic calculation of a command, a register 14 to temporarily store a command address, a command code, data required for calculation, a calculation result, etc. as a high-speed memory unit similar to the ALU 12, main memory units 16 and 18 for storing a command, a program, etc. for various computational operations performed by the vehicle control device 10, and a power controller 20 configured to adjust power applied to the vehicle control device 10, a serial communicator 26 configured to perform serial communication.

Additionally, the control device may include a general purpose input output (GPIO) 28 for designing an input and an output in response to an operation of the vehicle control device 10, a phase-locked loop (PLL) 24 configured to receive a system clock for a high-speed operation and adjust an output signal using a phase difference with a feedback signal in an input signal and an output signal to generate a system clock, a reset device 30 configured to adjust the power controller 20 in response to an externally transmitted reset or interrupt signal. Among components included in the vehicle control device 10, components for transmitting and receiving data may be connected to each other via a bus 22. The PLL 24 may be connected to an oscillator 32 configured to generate a signal with a preset specific frequency.

The vehicle watchdog device 40 may include a power controller 21 configured to adjust power, a watchdog controller 19 configured to adjust a watchdog operation, a register unit 17 configured to manage and store data generated in a watchdog procedure, a serial communicator 15 configured to perform serial communication, a reset generator 23 configured to generate a reset signal in response to a result of the watchdog controller 19. Components for transmitting and receiving data in the vehicle watchdog device 40 may be connected to each other via a bus 13.

As shown in FIG. 1, components for a vehicle watchdog function required to diagnose whether the vehicle watchdog device 40 is normally operated may be broadly classified into three types. A module 1 for communication between the vehicle control device 10 and the vehicle watchdog device 40. When a hardware fault is detected at a communication circuit between the vehicle control device 10 and the vehicle watchdog device 40 or at the serial communicator 15 inside the vehicle watchdog device 40, a query/response (Q&A) for a vehicle watchdog operation may be prevented from being performed.

Accordingly, when the vehicle control device 10 is operated normally, the vehicle watchdog device 40 may be configured to generate an unintended reset signal. Reference numeral 2 may be the watchdog controller 19 inside the vehicle watchdog device 40. Despite normal serial (SPI) communication between the vehicle control device 10 and the vehicle watchdog device 40, when normal query and response (Q&A) may not be performed due to malfunction of the watchdog controller 19, the vehicle watchdog device 40 may be also configured to generate an intended reset signal when the vehicle control device 10 is operated normally operated. Reference numeral 3 may indicate that a reset signal is transmitted and may be monitored through the reset generator 23 and a pattern (e.g., wirings and lines) on a printed circuit board (PCB) on which the vehicle control device 10 and the vehicle watchdog device 40 are disposed.

In some exemplary embodiments, when the vehicle control device 10 and the vehicle watchdog device 40 are connected through a vehicle network, a reset signal may also be transmitted via serial communication. When the wirings and lines between the reset generator 23, and the vehicle control device 10 and the vehicle watchdog device 40, which have been described in reference numeral 3, are abnormal, when the vehicle control device 10 malfunctions and query and response (Q&A) for a vehicle watchdog operation is abnormally, a reset signal may not be generated or transmitted. Accordingly, the vehicle control device 10 may not capable of being appropriately overcome (e.g., reset, interrupt, initialization, etc.). Accordingly, follow-up measures for detecting this situation may be required to indicate a malfunction code, replacing hardware, etc.

As described above, a vehicle watchdog circuit device according to an exemplary embodiment of the present disclosure may include a detector configured to monitor whether communication with a vehicle controller through a preset protocol is enabled. For example, the detector may include the serial communicator 15 shown in FIG. 1. In particular, a configuration of the detector may be adjusted according to a communication method used in connection or operative association between the vehicle watchdog circuit device and the vehicle controller.

The vehicle watchdog circuit device may further include an examiner configured to transmit an error detection query to the vehicle controller every preset period and receive a response to the error detection query to monitor an operation of the vehicle controller upon determining that a communication fault does not occur as a result of monitoring whether communication is enabled. For example, the examiner may include the watchdog controller 19 described with reference to FIG. 1. In particular, a shape and configuration of the examiner may be adjusted based on a method of implementing the vehicle watchdog circuit device.

The vehicle watchdog circuit device may include a reset signal generator configured to sequentially transmit a plurality of preset reset signals to the vehicle controller and monitors whether the plurality of preset reset signals is transmitted upon determining that the vehicle controller is operated normally. For example, the reset signal generator may include the watchdog controller 19 and the reset generator 23 that are described with reference to FIG. 1. In particular, a shape and configuration of the reset signal generator may be adjusted according to a method of implementing the vehicle watchdog circuit device.

When the vehicle control device 10 and the vehicle watchdog device 40 are connected via a vehicle network, recognition and operative association between the two devices may be detected by monitoring IDs (identification) assigned in a vehicle network. However, when the vehicle control device 10 and the vehicle watchdog device 40 are disposed separately on one board, the vehicle watchdog device 40 may use a chip identification number thereof instead of an ID assigned in a network. The vehicle watchdog device 40 may be configured to transmit the chip identification number thereof to the vehicle control device 10 and may monitor a chip identification number transmitted from the vehicle control device 10.

For example, a detector may be configured to transmit a chip identification number in a vehicle watchdog circuit to a vehicle controller, configured to receive information regarding a chip identification number is matched, from the vehicle controller, and determine whether communication is enabled based on a result of whether the identification number is matched. The vehicle control device 10 and the vehicle watchdog device 40 may be configured to pre-store chip identification numbers, when the vehicle watchdog device 40 transmits a request or query for transmitting information stored in the vehicle control device 10 and the vehicle control device 10 transmits the stored information in response to the corresponding request or query, the vehicle watchdog device 40 may be configured to compare the transmitted information and the unique chip identification number to monitor whether there is a problem in a communication connection between the vehicle watchdog device 40 and the vehicle control device 10.

In some exemplary embodiments, the examiner included in the vehicle watchdog circuit device may set a preset positive integer as a register value, may perform a first operation of transmitting an error detection query, may perform a second operation of receiving a response, and may perform a third operation of subtracting 1 from the register value when the response is normal.

For example, the examiner may be configured to repeatedly perform the first to third operations as many times as the preset positive integer. As a result, whether a value stored in a register (e.g., the register unit 17 of FIG. 1) included in the vehicle watchdog circuit device is 0 may be determined and whether the vehicle control device 10 is normally operated may be determined. For example, when the vehicle watchdog circuit device monitors whether the vehicle control device 10 is normally operated and then determines whether the vehicle control device 10 is abnormal once, the vehicle control device 10 may be reset even when reset or interrupt is not required. Accordingly, when the vehicle watchdog circuit device transmits a result, (e.g., an error detection query) to the vehicle control device 10 a plurality of numbers of times and monitors whether an error occurs in the vehicle control device 10, reliability of a monitoring result may be enhanced.

The reset generator 23 included in the vehicle watchdog device 40 may be configured to transmit a preset reset signal to the vehicle control device 10 every preset period. The vehicle control device 10 may be configured to store the reset signal transmitted from the vehicle watchdog device 40 in the register. A plurality of reset signals may be transmitted and, then, a register value of the vehicle controller may be monitored. When a transmission number of times of the preset reset signal may be equal to the register value, the reset signal generated by the reset generator 23 may be determined to be transmitted normally.

The error detection query transmitted from the vehicle watchdog device 40 may be transmitted every preset period a plurality of numbers of times. A transmission number of times of the error detection query may be less by at least one than a reference number of times for generating a reset signal for resetting or interrupting the vehicle control device 10.

Although not shown, the vehicle watchdog device 40 may further include an output unit configured to output different malfunction signals or error codes in response when a detection error in communication with the vehicle control device 10, when the vehicle control device 10 is abnormally operated, and the vehicle control device 10 may not be normally reset. The vehicle watchdog device 40 may be configured to recognize the vehicle control device 10 upon receiving power in one of a vehicle turn-on state (IGN/Start), an electronic device activation state (ON), and an accessory activation state (ACC).

In some exemplary embodiments, the vehicle control device 10 may further include a transceiver configured to transmit and receive data to and from a plurality of control modules and a plurality of switching circuits via a vehicle network. For example, the transceiver may include at least one of the serial communicator 26 or the GPIO 28 that are described with reference to FIG. 1. For example, a configuration and function of the transceiver may be adjusted in response to a communication connection method of the vehicle control device 10 and a peripheral circuit arranged around the vehicle control device 10.

The vehicle control device 10 may include a storage configured to store information and control programs of a plurality of control modules and a plurality of switching circuits. For example, the storage may include the register 14 configured to store data for arithmetical calculation, a flash memory 18 for storing code, etc., a volatile memory 16 configured to load data or programs for calculation and control functions, etc. The register 14 may be divided into a plurality of regions and used based on an objective and type of the stored data or may include a plurality of units.

The vehicle control device 10 may include a calculator configured to apply data from the transceiver and the storage to the unique information and the control programs to perform calculation. For example, the calculator may include the ALU 12, etc. shown in FIG. 1. The calculator may be configured to receive a control program that corresponds to an error detection query and may be configured to perform calculation and, transmit the calculation result to the vehicle watchdog circuit via the transceiver.

The vehicle control device 10 may include an interrupt unit configured to detect the vehicle watchdog circuit through the transceiver, transmit the error detection query transmitted from the vehicle watchdog device 40 to the calculator, and generate reset or interrupt in response to a plurality of preset reset signals transmitted from the vehicle watchdog device 4. For example, the interrupt unit may include the reset device 30, etc. shown in FIG. 1.

The vehicle control device 10 may include an input and output unit configured to interrupt reception of a reset signal transmitted to the interrupt unit in response to a diagnosis result transmitted from the vehicle watchdog circuit. For example, the input and output unit may further include the GPIO 28 and a switching unit 36 shown in FIG. 1. In some exemplary embodiments, the switching unit 36 may include a transistor. The vehicle control device 10 notified of an error in the vehicle watchdog device 40 may be configured to interrupt and prevent the reset signal output from the vehicle watchdog device 40 from impacting the vehicle control device 10 through the switching unit 36. For example, the diagnosis result of determining a state of the switching unit 36 may include a result of at least one of whether a communication function in a vehicle watchdog circuit malfunctions, whether a watchdog control function malfunctions, or whether a reset signal generation function malfunctions.

The vehicle control device 10 may be configured to generate reset or interrupt when a register value of the interrupt unit is M (e.g., natural number). When power is supplied to the vehicle control device 10 and the interrupt unit detects the vehicle watchdog circuit, an internal value of the register 14 may be initialized to a value that is less than M by at least one.

The vehicle control device 10 may include a switching mode power supply (SMPS) 34 configured to supply power to the vehicle control device 10 and the vehicle watchdog device 40. The SMPS 34 may include a power supply device using a switching operation and components disposed in a vehicle may be reduced in size and weight due to a switching frequency of several tens to several hundred kHz.

Figure 2:
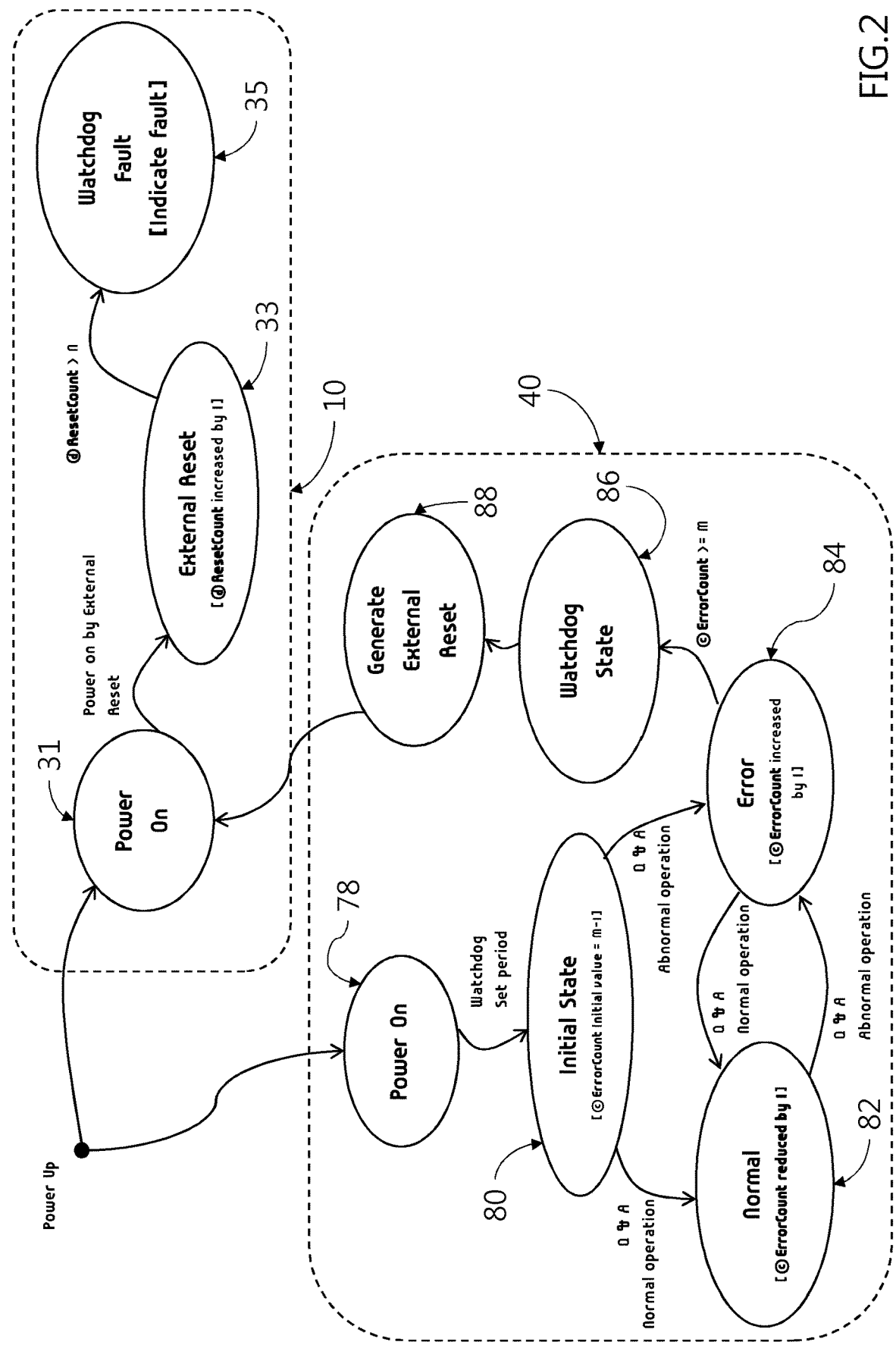
FIG. 2 is an exemplary diagram for explanation of operation states of the vehicle control device and the vehicle watchdog device described with reference to FIG. 1 according to an exemplary embodiment of the present disclosure.

FIG. 2 is an exemplary diagram for explanation of operation states of the vehicle control device 10 and the vehicle watchdog device 40 described with reference to FIG. 1. As shown, when the vehicle control device 10 and the vehicle watchdog device 40 power up, the vehicle watchdog device 40 may transition to a power on mode 78. A query and response (Q&A) period for a vehicle watchdog operation set by a user may be set and a current state may enter an initial state 80. In particular, a register value (e.g., Error Count) indicated by reference numeral C of the register unit 17 described with reference to FIG. 1 may be set to M−1 (e.g., M is a positive integer greater than or equal to 2). When the query and response (Q&A) is performed normally, the register value (Error Count) may be reduced by 1 and a current state may transition to a normal state. When the query and response (Q&A) is continuously and performed normally, the normal state 82 may be maintained and the register value (e.g., Error Count) may be reduced to 0. When the query and response (Q&A) is performed abnormally, the register value (e.g., Error Count) may be increased by 1 and a current state may transition to an error state 84. When the query and response (Q&A) is continuously and performed abnormally and the register value (e.g., Error Count) may be increased to a reference value M or greater, a current state may be determined to be a watchdog state 86 to generate a reset signal (88).

Upon determining that a reset signal transmitted from the vehicle watchdog device 40 is received, the vehicle control device 10 may be transmitted to a reset standby state (e.g., external reset 33). A reset number of times (e.g., Reset Count) indicated by reference numeral D shown in FIG. 1 may be increased by 1. When the reset signal transmitted from the vehicle watchdog device 40 is transmitted a plurality of numbers of times and Reset Count exceeds a reference value N, a watchdog fault code for a vehicle may be indicated and a user may recognize a circuit fault.

Figure 3:
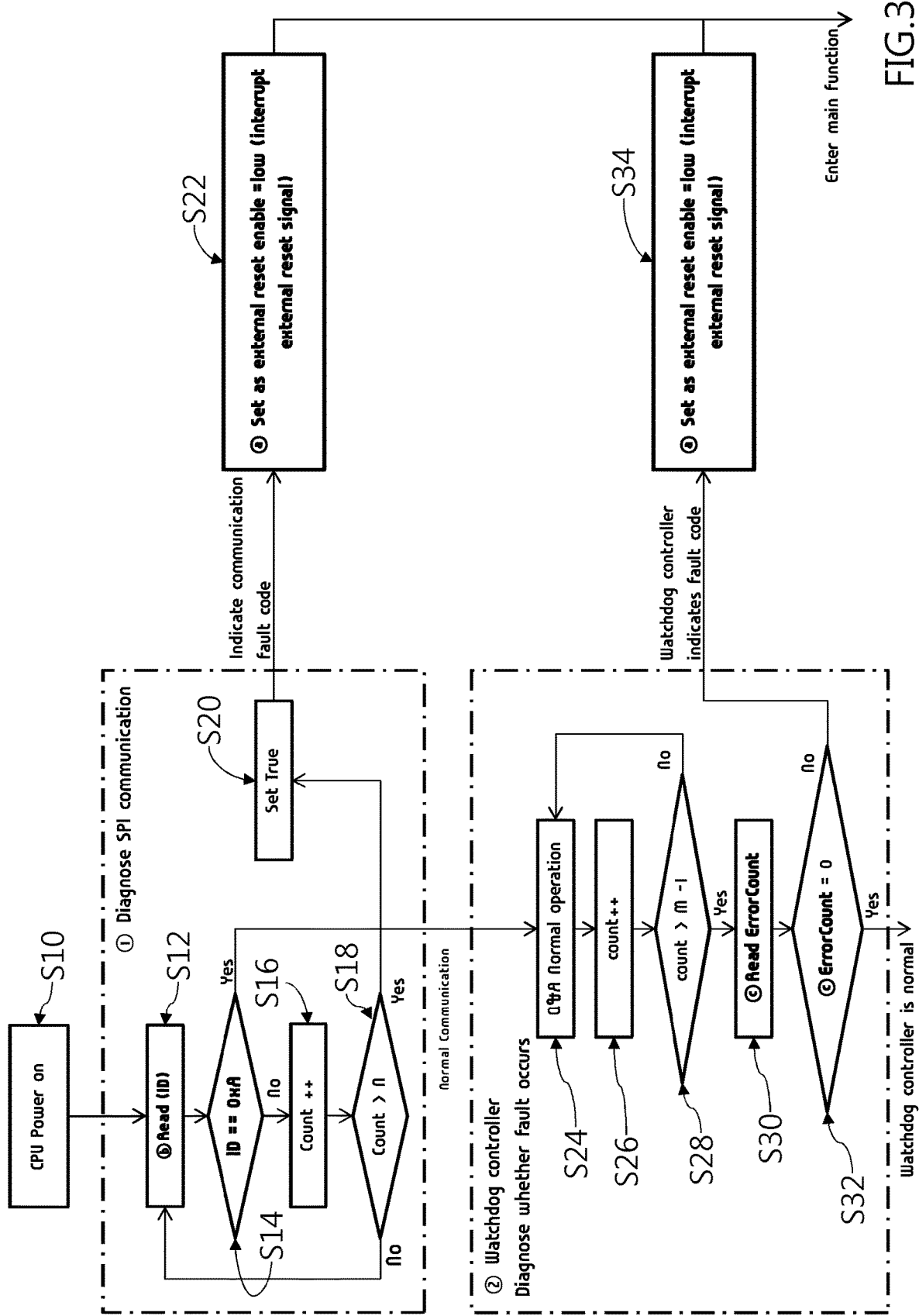
FIG. 3 is an exemplary diagram for explanation of a first operation example of a vehicle watchdog device according to an exemplary embodiment of the present disclosure.

FIG. 3 is an exemplary diagram illustrating of a first operation example of a vehicle watchdog device. As shown, the first operation example may include a diagnosis algorithm of a component included in a vehicle watchdog function that requires normal operation diagnosis in the vehicle watchdog device 40 (refer to FIG. 1). When the vehicle control device 10 (refer to FIG. 1) initiates power, the vehicle control device 10 may enter a boot sequence and a function for diagnosing a communication module between the vehicle control device 10 and the vehicle watchdog device 40 of reference numeral 1 shown in FIGS. 1 and 3 may be initially performed. Generally, the vehicle control device 10 and the vehicle watchdog device 40 may be arranged in the form of respective chips on one PCB and may be configured to perform query and response (Q&A) performed by the vehicle watching device via serial (SPI) communication between different chips. To diagnose whether serial (SPI) communication is abnormal, a chip identification (ID) in the register unit 17 in the vehicle watchdog device 40 indicated by reference numeral B shown in FIG. 1 may be used. For example, the chip ID may be a unique number assigned when a chip of the vehicle watchdog device 40 is manufactured and may be a fixed value that is not changed after the chip of the vehicle watchdog device 40 is manufactured. Accordingly, the vehicle control device 10 may be configured to read a chip ID value via serial (SPI) communication (S12) and monitor whether the value is abnormal (S14) to detect whether serial (SPI) communication is abnormal.

As shown in FIG. 3, when the chip ID value is read and the chip ID value is normal, serial (SPI) communication may be determined to be normal and the vehicle control device 10 may enter a next sequence (e.g., reference numeral 2). When the chip ID value is read as a different value that is not a set value, the current operations may be performed several times that is a preset value N (S16 and S18. When the ID is not continuously read as the set value (the determination result of S18), communication fault may be determined (S20). When a serial (SPI) module is abnormal, the vehicle watchdog device 40 may not perform the query and response (Q&A) and the vehicle watchdog device 40 may be configured to generate a reset signal irrespective of whether the vehicle control device 10 is normally operated. To prevent this malfunction, the vehicle control device 10 may interrupt the reset signal generated by the vehicle watchdog device 40 through the switching unit 36 between the vehicle control device 10 and the vehicle watchdog device 40 as indicated by reference 3 of FIG. 1 (S22). After the reset signal is interrupted, initialization may be immediately terminated without performing an initialization function of a vehicle watchdog, a fault code may be indicated, and a control device may enter an endless or infinite loop.

When serial (SPI) communication is determined to be normal, a logic for diagnosing whether the watchdog controller 19 indicated by reference numeral 2 shown in FIG. 1 is operated normally may be performed (S24 to S32). As described with reference to FIG. 2, the register value (e.g., Error Count) in the vehicle watchdog device 40 may initially have a value of M−1, which is non-zero. Accordingly, to diagnose whether the watchdog controller 19 is operated normally, query and response (Q&A) may be performed normally (M−1) times or more (S24, S26, and S28) and whether the register value (Error Count) is normally reduced to 0 may be monitored (S30 and S32).

When the watchdog controller 19 is abnormal and the query/response (Q&A) is performed normally, the register value (e.g., Error Count) may not be reduced to 0. Accordingly, when the query and response (Q&A) is performed normally d, when the register value (e.g., Error Count) is not reduced to 0 (No of S32), the watchdog controller 19 may be determined to be operated abnormally and the vehicle control device 10 may be configured to interrupt the reset signal through the switching unit 36 shown in reference numeral 3 of FIG. 1 (S34). Additionally, initialization may be immediately terminated without performing an initialization function of the vehicle watchdog device 40, a fault code may be indicated, and a control device may enter an endless or infinite loop.

Figure 4:
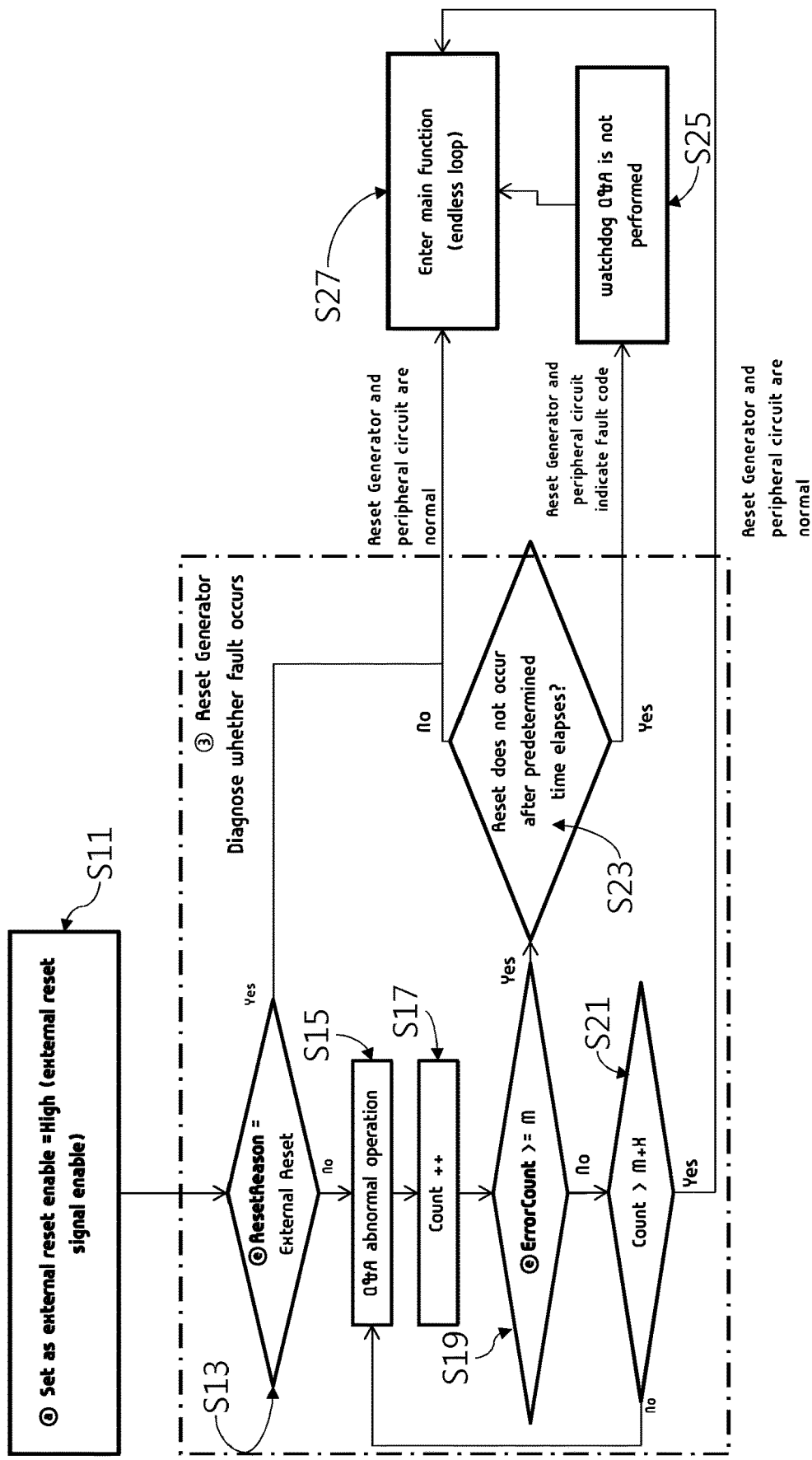
FIG. 4 is an exemplary diagram for explanation of a second operation example of a vehicle watchdog device according to an exemplary embodiment of the present disclosure.

FIG. 4 is an exemplary diagram for explanation of a second operation example of a vehicle watchdog device. In some exemplary embodiments, the operation example may be continuously performed in the first operation example shown in FIG. 3. As shown, when the watchdog controller 19 is determined to be normal (S11), whether the wirings and lines for transmitting a reset signal between the reset generator 23 in the vehicle watchdog device 40 indicated by reference numeral 3 shown in FIG. 1, and the vehicle control device 10 and the vehicle watchdog device 40 are normal may be diagnosed (S13 to S23). For example, a diagnosis method may include monitoring (S13) the register 14 that records a reset reason (e.g., Reset Reason) indicated by reference numeral E shown in FIG. 1, determining (S15) that query and response (Q&A) is abnormally performed when Reset Reason is not generated by the vehicle watchdog device 40 (S15), and the register value (e.g., Error Count) may be increased (S17). When the register value (e.g., Error Count) is greater than or equal to the reference value (M) (YES of S19) and the reset generator 23 is operated normally, the reset signal may be generated normally and the vehicle control device 10 may be reset (No of S23).

However, when the reset generator 23 is operated abnormally, when the query and response (Q&A) is performed abnormally a predetermined number of times or more and the register value (e.g., Error Count) may be greater than or equal to the reference value M, the vehicle control device 10 may not be reset (YES of S23). In particular, a fault may be determined to be generated in the wirings and lines for transmitting a reset signal between the reset generator 23 in the vehicle watchdog device 40 and the vehicle control device 10. Accordingly, the query and response (Q&A) may not be performed (S25) and a control device may enter an endless or infinite loop.

Upon monitoring that Reset Reason is generated by an external reset signal initially in reference numeral 3 (Yes of S13), it may be determined whether the wirings and lines for transmitting a reset signal between the reset generator 23 in the vehicle watchdog device 40 are normal has been diagnosed or a watchdog may be generated due to an error of the vehicle control device 10. In particular, the control device may be configured to enter an endless or infinite loop without diagnosing whether the wirings and lines for transmitting a reset signal between the reset generator 23 in the vehicle watchdog device 40 is normal (S27).

Figure 5:
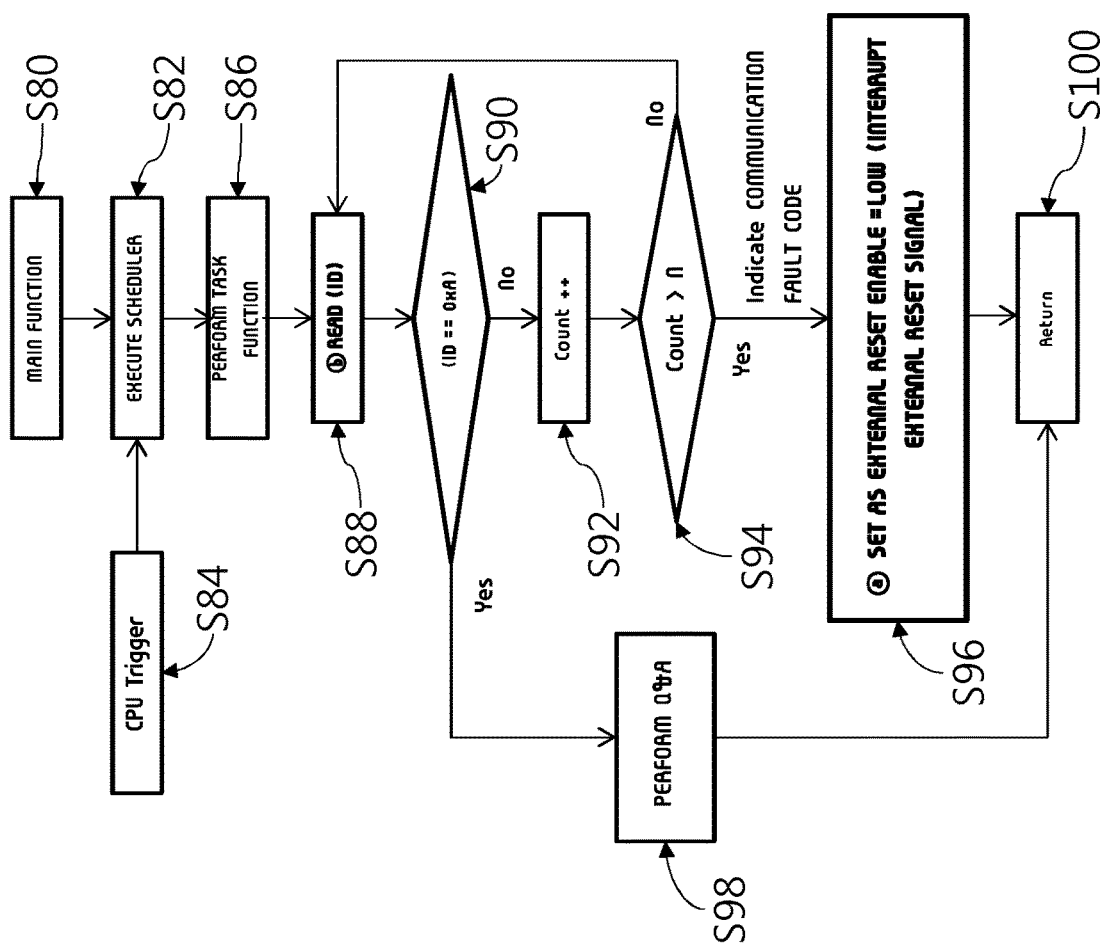
FIG. 5 is an exemplary diagram for explanation of a third operation example of a vehicle watchdog device according to an exemplary embodiment of the present disclosure.

FIG. 5 is an exemplary diagram for explanation of a third operation example of a vehicle watchdog device. As shown, the third operation example may include a logic for diagnosing whether a circuit for performing serial (SPI) communication is normal while the vehicle watchdog device 40 performs query and response (Q&A). A hardware fault may be generated due to vibration during vehicle driving. When a hardware fault occurs in wiring, lines, etc. on a PCB pattern on which the vehicle watchdog device 40 and the vehicle control device 10 are arranged, data exchange using a serial (SPI) communication method between the vehicle watchdog device 40 and the vehicle control device 10 may be difficult.

In particular, the vehicle watchdog device 40 may not be capable of transmitting and receiving query and response (Q&A) and the vehicle control device 10 may be unintentionally reset by the reset signal generated by the vehicle watchdog device 40. Accordingly, when query and response (Q&A) is periodically (S84 and S82) transmitted and received (S86), whether a module (e.g., wirings, the serial communicator 26, the serial communicator 15, etc.) for serial (SPI) communication is normal may be diagnosed (e.g., whether a chip ID is matched may be determined) (S90). Further, upon determining that an error occurs in the module for serial (SPI) communication (S94), performing of query and response (Q&A) may be diagnosed (S98) and a reset signal may be interrupted (S96). For example, whether the module (e.g., wirings, the serial communicator 26, the serial communicator 15, etc.) for serial (SPI) communication is normal may be diagnosed a plurality of numbers of times (e.g., N times) (S92 and S94).

Figure 6:
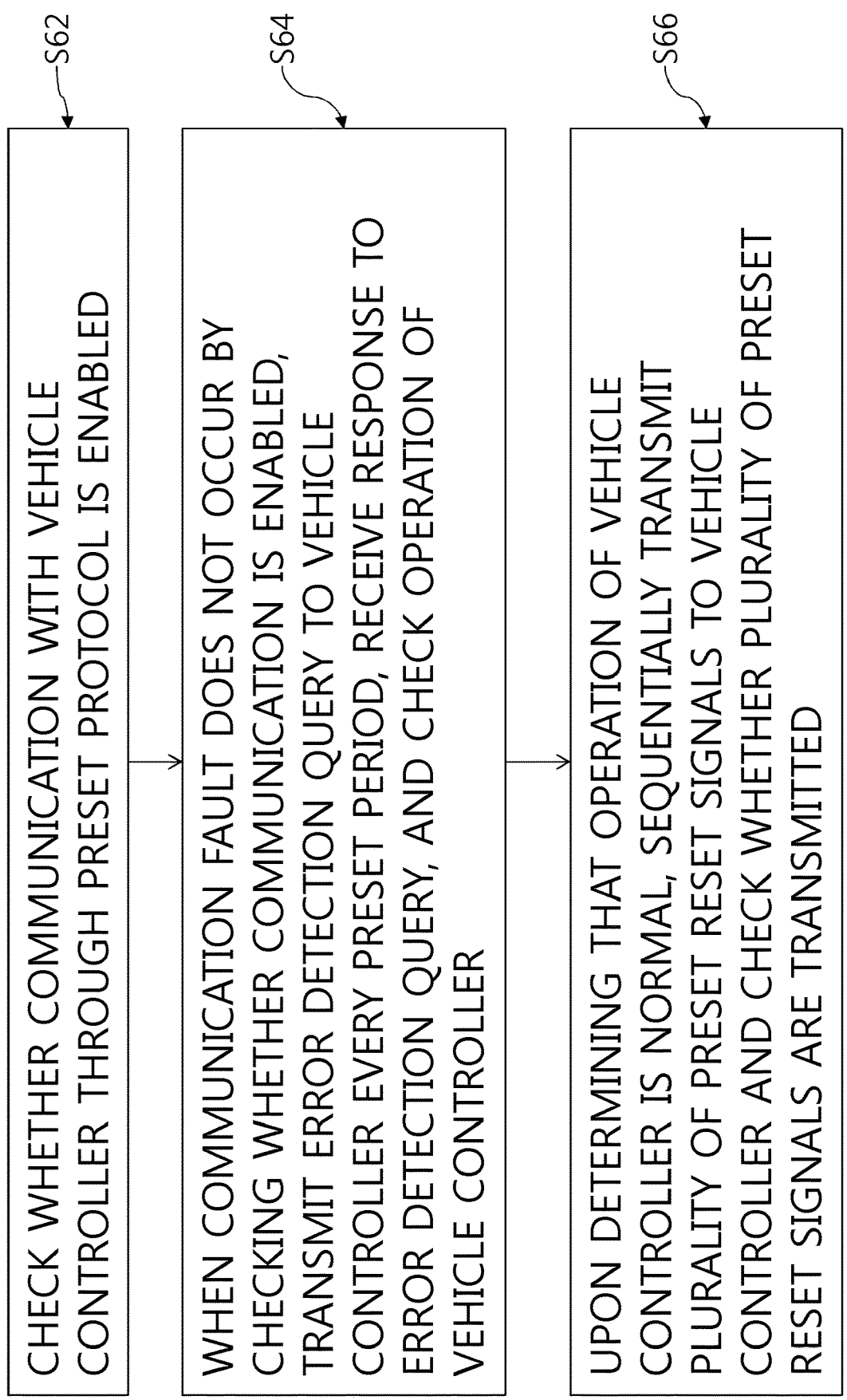
FIG. 6 is an exemplary diagram for explanation of a fourth operation example of a vehicle watchdog device according to an exemplary embodiment of the present disclosure.

FIG. 6 is an exemplary diagram illustrating of a fourth operation example of a vehicle watchdog device. As shown, the fourth operation example may relate to an operating method of the vehicle watchdog circuit and the method may include monitoring (S62) whether communication with a vehicle controller is enabled through a preset protocol (S62). When a communication fault does not occur by monitoring whether communication is enabled, an error detection query to the vehicle controller every preset period may be transmitted, receiving a response to the error detection query may be received, and an operation of the vehicle controller may be monitored (S64). Upon determining that the operation of the vehicle controller is normal, sequentially transmitting a plurality of preset reset signals may be sequentially transmitted to the vehicle controller and whether the plurality of preset reset signals are transmitted) may be monitored (S66). For example, a third operation performed in the operating method of the vehicle watchdog circuit may include an operation based on the function and algorithm described with reference to FIGS. 3 and 4.

In particular, the error detection query transmitted to the vehicle controller from the vehicle watchdog circuit may be transmitted every preset period a plurality of times. For example, a transmission number of times of the error detection query may be less than a reference number of times for generating a reset signal for resetting or interrupting the vehicle controller by at least one. The vehicle controller that is operatively associated with the vehicle watchdog circuit may be autonomously and forcibly interrupted or reset in response to the register value.

The operating method of the vehicle watchdog circuit may further include outputting different fault signals or error codes in response to when a communication fault occurs, when the operation of the vehicle controller is not normal, and when the vehicle controller is not reset. In particular, along with the error code, the vehicle controller may be configured to interrupt a reset signal to the vehicle controller not to be autonomously reset by the reset signal by the vehicle watchdog circuit.

The operating method of the vehicle watchdog circuit may further include recognizing the vehicle controller upon receiving power in one of a vehicle turn-on state (IGN/Start), an electronic device activation state (ON), and an accessory activation state (ACC).

Figure 7:
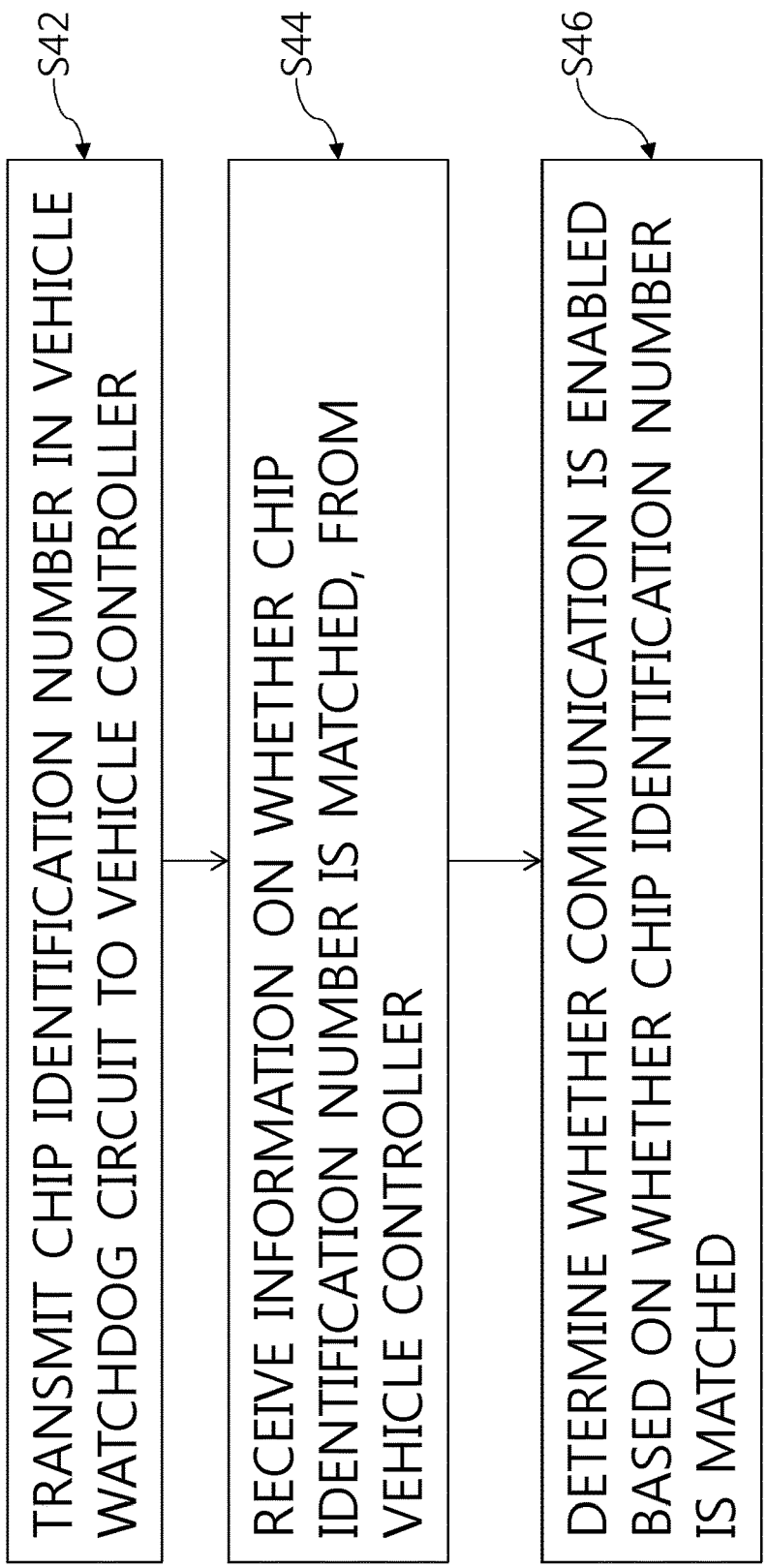
FIG. 7 is an exemplary diagram for explanation of a fifth operation example of a vehicle watchdog device according to an exemplary embodiment of the present disclosure.

FIG. 7 is an exemplary diagram for an exemplary embodiment of a fifth operation example of a vehicle watchdog device. As shown, the fifth operation example may be used to monitor whether communication is enabled and may include transmitting a chip identification number in a vehicle watchdog circuit to the vehicle controller (S42), receiving information on whether a chip identification number is matched, from the vehicle controller (S44), and determining whether communication is enabled based on whether the chip identification number is matched (S46).

Figure 8:
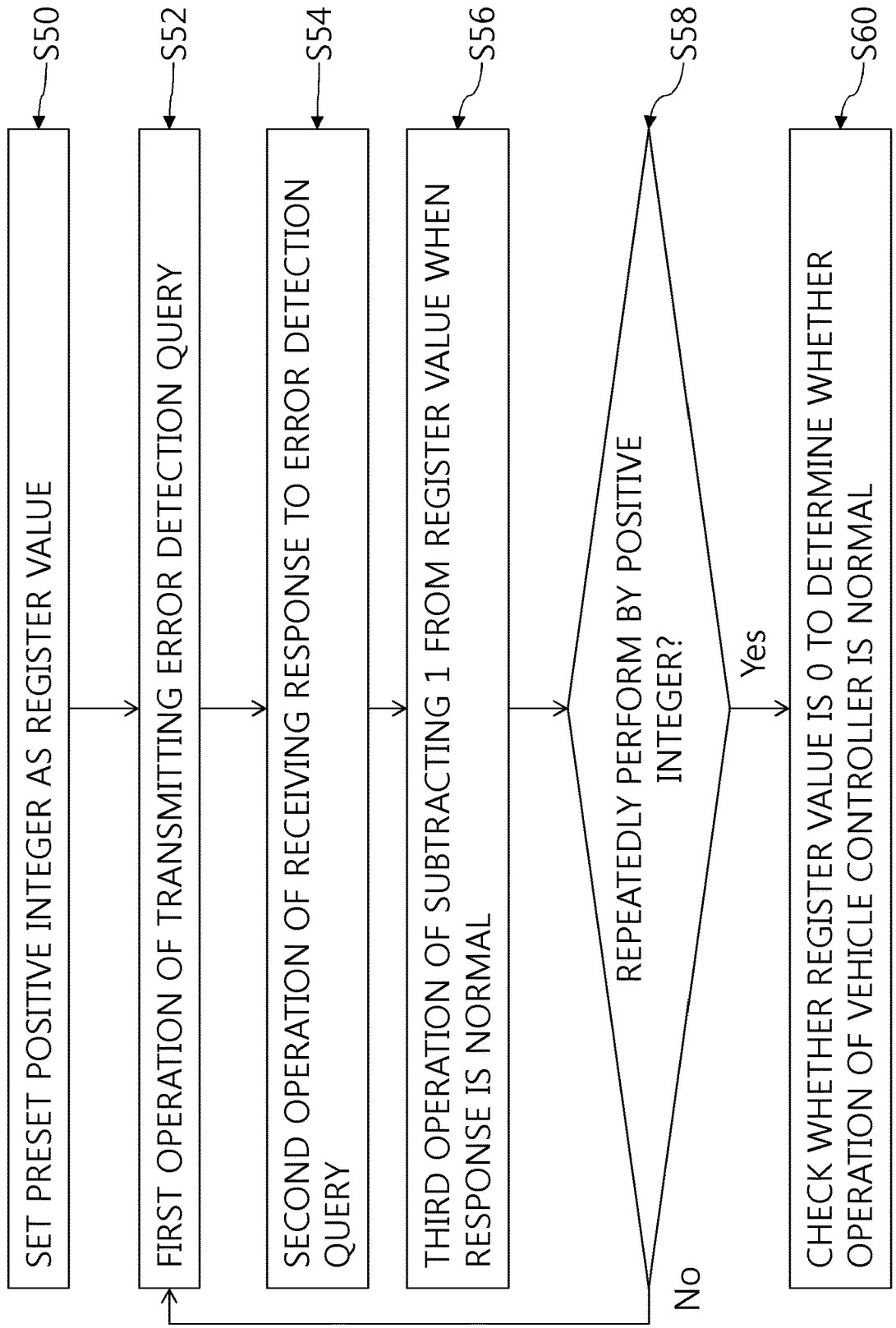
FIG. 8 is an exemplary diagram for explanation of a sixth operation example of a vehicle watchdog device according to an exemplary embodiment of the present disclosure.

FIG. 8 is an exemplary diagram for an exemplary embodiment of a sixth operation example of a vehicle watchdog device. As shown, the sixth operation example may be used to monitor an operation of a vehicle controller and may include setting a preset positive integer as a register value (S50), a first operation of transmitting an error detection query (S52), a second operation of receiving a response to the error detection query transmitted from the vehicle controller (S54), and a third operation of subtracting 1 from the register value when the response is normal (S56). To monitor the operation of the vehicle controller, the first to third operations may be repeatedly performed as many times as the positive integer (S58). Then, whether the register value is 0 may be monitored to determine whether the operation of the vehicle controller is normal (S60).

Figure 9:
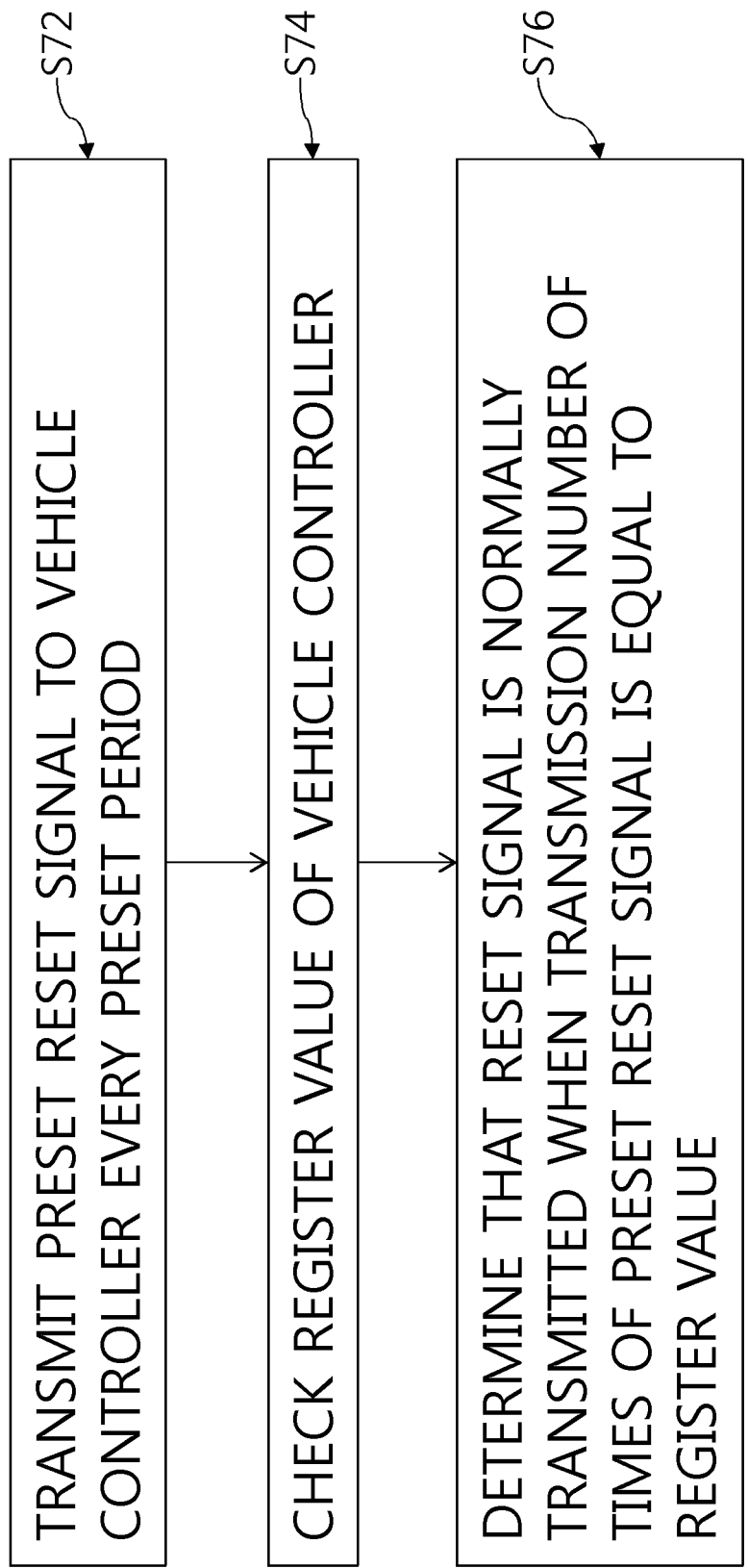
FIG. 9 is an exemplary diagram for explanation of a seventh operation example of a vehicle watchdog device according to an exemplary embodiment of the present disclosure.

FIG. 9 is an exemplary diagram for an exemplary embodiment of a seventh operation example of a vehicle watchdog device. As shown, the seventh operation example may be used to monitor whether the vehicle controller is reset and may include transmitting a preset reset signal to the vehicle controller every preset period (S72), monitoring a register value of the vehicle controller (S74), and determining that the reset signal is normally transmitted when a transmission number of times of the preset reset signal is equal to the register value (S76).

According to the aforementioned exemplary embodiments, when a fault occurs in a vehicle watchdog circuit device and a peripheral circuit thereof, a risk of an abnormal operation due to an incorrect result (e.g., a vehicle watchdog circuit device causes reset of a vehicle control device even if a vehicle control device is normally operated) may be reduced. In particular, according to an exemplary embodiment of the present disclosure, whether a fault occurs in a functional unit of the vehicle watchdog circuit device and peripheral circuits may be diagnosed and a strategy corresponding to each situation in the case of a fault may be established to prevent risk due to an abnormal operation. Thereby, operation safety and reliability of the vehicle control device may be enhanced.

The embodiments of the present disclosure may be applied to a vehicle electronic device or a vehicle computing device (e.g., a power control system, a clock system, a data network, a BUS controller, etc.) for detecting and restoring a malfunction through a watchdog circuit. A controller installed in a vehicle may be configured to detect defects of a watchdog circuit and may regularly restart the watchdog circuit when time elapses or to prevent "timeout" during a normal operation to diagnosis a fault of an electronic device, a computing device, and an embedded system installed in a vehicle, thereby enhancing reliability.

The method according to the exemplary embodiments of the disclosure may be being embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc.

The computer readable recording medium may also be distributed over network coupled computer systems so that the computer readable code is stored and executed in a distributed fashion. Additionally, functional programs, code, and code segments for accomplishing the present disclosure may be more easily construed by programmers skilled in the art to which the present disclosure pertains.

The apparatus and method according to the present disclosure may have the following effects. The present disclosure may prevent instability of a vehicle controller (e.g., a vehicle central processing device) that requires safety and may also greatly enhance vehicle control reliably. The driving safety of a central processing unit (CPU) as a core component of a vehicle controller in an environment in which an electronic control system installed in a vehicle may be extensively used, thereby preventing malfunction of the electronic control system.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. An operating method of a vehicle watchdog circuit engaged with a vehicle controller, comprising:
   checking whether communication with the vehicle controller through a preset protocol is enabled;
   monitoring whether communication is enabled when a communication fault is prevented;
   transmitting an error detection query to the vehicle controller every preset period, receiving a response to the error detection query; and
   monitoring an operation of the vehicle controller; and
   determining that the operation of the vehicle controller is normal, and sequentially transmitting a plurality of preset reset signals to the vehicle controller and monitoring whether the plurality of preset reset signals are transmitted.

2. The method according to claim 1, wherein the monitoring of whether communication is enabled includes:
   transmitting a chip identification number in a vehicle watchdog circuit to the vehicle controller;
   receiving information on whether the chip identification number is matched, from the vehicle controller; and
   determining whether communication is enabled based on whether the chip identification number is matched.

3. The method according to claim 1, wherein the error detection query is transmitted every preset period a plurality of times.

4. The method according to claim 1, wherein a transmission number of times of the error detection query is less than at least one than a reference number of times for generating a reset signal for resetting or interrupting the vehicle controller.

5. The method according to claim 1, wherein the monitoring of the operation of the vehicle controller includes:
setting a preset positive integer as a register value;
transmitting the error detection query;
receiving the response;
subtracting 1 from the register value when the response is normal;
performing the transmitting of the error detection query multiple times, receiving of the response, and the subtracting as many times as the positive integer; and
monitoring whether the register value is 0 to determine whether the operation of the vehicle controller is normal.

6. The method according to claim 1, wherein the monitoring of the operation of the vehicle controller includes:
transmitting the preset reset signal to the vehicle controller every preset period;
monitoring a register value of the vehicle controller; and
determining that the reset signal is normally transmitted when a transmission number of times of the preset reset signal is equal to the register value.

7. The method according to claim 6, wherein the vehicle controller is configured to generate a corresponding one of forcible interrupt and reset in response to the register value.

8. The method according to claim 1, further comprising:
outputting a corresponding different fault signals and error codes in response when a communication fault occurs, when the operation of the vehicle controller is abnormal, and when the vehicle controller fails to reset.

9. The method according to claim 1, further comprising:
recognizing the vehicle controller upon receiving power when a vehicle turn-on state (IGN/Start), an electronic device activation state (ON), and an accessory activation state (ACC).

10. A vehicle watchdog circuit device, comprising:
a detector configured to monitor whether communication with a vehicle controller through a preset protocol is enabled;
an examiner configured transmit an error detection query to the vehicle controller every preset period, to receive a response to the error detection query, and monitor an operation of the vehicle controller, when a communication fault does not occur by monitoring whether communication is enabled; and
a reset signal generator configured to sequentially transmit a plurality of preset reset signals to the vehicle controller and monitor whether the plurality of reset signals are transmitted when determining that the operation of the vehicle controller is normal.

11. The vehicle watchdog circuit device according to claim 10, wherein the detector is configured to transmit a chip identification number in a vehicle watchdog circuit to the vehicle controller, receive information whether the chip identification number is matched from the vehicle controller, and determines whether communication is enabled based on whether the chip identification number is matched.

12. The vehicle watchdog circuit device according to claim 10, wherein the error detection query is transmitted every preset period a plurality of times; and wherein a transmission number of times of the error detection query is less than at least one than a reference number of times for generating a reset signal for resetting or interrupting the vehicle controller.

13. The vehicle watchdog circuit device according to claim 10, wherein the examiner is configured to determine a preset positive integer as a register value, transmit the error detection query, receive the response, wherein when the response is normal, subtracts 1 from the register value, repeatedly performs the transmitting of the error detection query, the receiving of the response, and the subtracting as many times as the positive integer, and determine whether the register value is 0 to determine whether the operation of the vehicle controller is normal.

14. The vehicle watchdog circuit device according to claim 10, wherein the reset signal generator is configured to transmit the preset reset signal to the vehicle controller every preset period, checks a register value of the vehicle controller, and, when a transmission number of times of the preset reset signal is equal to the register value, determines that the reset signal is normally transmitted.

15. The vehicle watchdog circuit device according to claim 12, further comprising:
an output unit configured to generate a corresponding one of different fault signals and error codes in response to when a communication fault occurs, when the operation of the vehicle controller is abnormal, and when the vehicle controller is not reset.

16. The vehicle watchdog circuit device according to claim 12, wherein the detector is configured to recognize the vehicle controller upon receiving power when a vehicle turn-on state (IGN/Start), an electronic device activation state (ON), and an accessory activation state (ACC).

17. A vehicle control device, comprising:
a transceiver configured to transmit and receive data to and from a plurality of control modules and a plurality of switching circuits via a vehicle network;
a storage configured to store information and a control program for the plurality of control modules and the plurality of switching circuits;
a calculator configured to apply the data from the transceiver and the storage to the information and the control program to perform a calculation;
an interrupt unit configured to detect a vehicle watchdog circuit through the transceiver, transmit the error detection query transmitted from the vehicle watchdog circuit to the calculator, and generate a corresponding reset and interrupt in response to a plurality of preset reset signals transmitted from the vehicle watchdog circuit; and
an input and output unit configured to interrupt reception of the reset signal transmitted to the interrupt unit in response to a diagnosis result transmitted from the vehicle watchdog circuit.

18. The vehicle control device according to claim 17, wherein a corresponding reset and the interrupt is generated when a register value of the interrupt unit is M, and wherein, when power is supplied and the interrupt unit is configured to detect the vehicle watchdog circuit, the register value is initialized to a value less than M by at least one.

19. The vehicle control device according to claim 17, wherein the calculator is configured to receive a control program that corresponds to the error detection query from the storage and perform calculation and transmit a calculation result to the vehicle watchdog circuit via the transceiver.

20. The vehicle control device according to claim 17, wherein the diagnosis result includes a result of at least one of whether a communication function in the vehicle watchdog circuit malfunctions, whether a watchdog control function malfunctions, or whether the reset signal generation function malfunctions.

* * * * *